United States Patent
Lee (10) Patent No.: US 10,227,089 B2
(45) Date of Patent: Mar. 12, 2019

(54) FRONT AXLE OF VEHICLE CAPABLE OF REDUCING VIBRATION

(71) Applicant: Hyundai Motor Company, Seoul (KR)

(72) Inventor: Dong-Wook Lee, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 8 days.

(21) Appl. No.: 15/343,748

(22) Filed: Nov. 4, 2016

(65) Prior Publication Data
US 2017/0233003 A1   Aug. 17, 2017

(30) Foreign Application Priority Data
Feb. 11, 2016   (KR) .................. 10-2016-0015575

(51) Int. Cl.
*B62D 7/18*    (2006.01)
*B62D 7/22*    (2006.01)
*F16N 9/00*    (2006.01)

(52) U.S. Cl.
CPC .............. *B62D 7/18* (2013.01); *B62D 7/228* (2013.01); *F16N 9/00* (2013.01)

(58) Field of Classification Search
CPC .............. B62D 7/18; B62D 7/228; F16N 9/00
See application file for complete search history.

(56) References Cited

U.S. PATENT DOCUMENTS

| | | | | |
|---|---|---|---|---|
| 1,363,211 A | * | 12/1920 | Aschaur | B62D 7/18 280/93.512 |
| 1,859,149 A | * | 5/1932 | Meggs | B62D 7/18 280/93.512 |
| 1,866,724 A | * | 7/1932 | Raule | B62D 7/18 280/89 |
| 1,932,340 A | * | 10/1933 | Goltry | B62D 7/18 280/93.512 |
| 2,057,372 A | * | 10/1936 | Douglas | B62D 7/18 280/93.512 |
| 2,453,291 A | * | 11/1948 | Wilford | B62D 7/18 384/613 |
| 6,071,032 A | | 6/2000 | Link | |
| 6,663,124 B1 | * | 12/2003 | Thompson | B62D 7/18 280/93.512 |
| 7,255,483 B1 | * | 8/2007 | Vranish | F16C 19/36 384/551 |

(Continued)

FOREIGN PATENT DOCUMENTS

| | | |
|---|---|---|
| JP | 2005-047301 A | 2/2005 |
| KR | 20-1998-028515 U | 8/1998 |

(Continued)

*Primary Examiner* — Laura Freedman
(74) *Attorney, Agent, or Firm* — Morgan, Lewis & Bockius LLP (57) ABSTRACT

A front axle of a vehicle, configured for reducing vibration, which is connected to a knuckle having a front wheel disposed thereon through a king pin, in which a gap may be formed between the knuckle and the king pin passing through the front axle and the knuckle, and filled with lubricant oil, and at least one of the king pin and the knuckle may include a plurality of rollers disposed therein, the rollers having an axis parallel to an axial direction of the king pin while circumferences of the rollers are partially buried in at least one of the king pin and the knuckle.

10 Claims, 10 Drawing Sheets

(56) References Cited

U.S. PATENT DOCUMENTS

| | | | |
|---|---|---|---|
| 8,070,177 B2 * | 12/2011 | Eveley | B62D 7/18 280/124.116 |
| 8,490,986 B1 * | 7/2013 | Ostrander | B62D 7/18 280/93.512 |
| 2005/0242540 A1 | 11/2005 | Gottschalk | |

FOREIGN PATENT DOCUMENTS

| | | | |
|---|---|---|---|
| KR | 10-2004-0011303 A | 2/2004 | |
| KR | 10-2011-0062107 A | 6/2011 | |
| WO | WO-2008056440 A1 * | 5/2008 | B62D 7/18 |

* cited by examiner

FRONT AXLE OF VEHICLE CAPABLE OF REDUCING VIBRATION

CROSS-REFERENCE TO RELATED APPLICATIONS

The present application claims priority to Korean Patent Application No. 10-2016-0015575, filed Feb. 11, 2016, the entire contents of which is incorporated herein for all purposes by this reference in its entirety.

BACKGROUND OF THE INVENTION

Field of the Invention

Various embodiments of the present invention relate to a front axle of a vehicle, which includes a structure through which grease can flow at a connection portion between a king pin and a knuckle, in order to reduce vibration.

Description of Related Art

Figure 1:
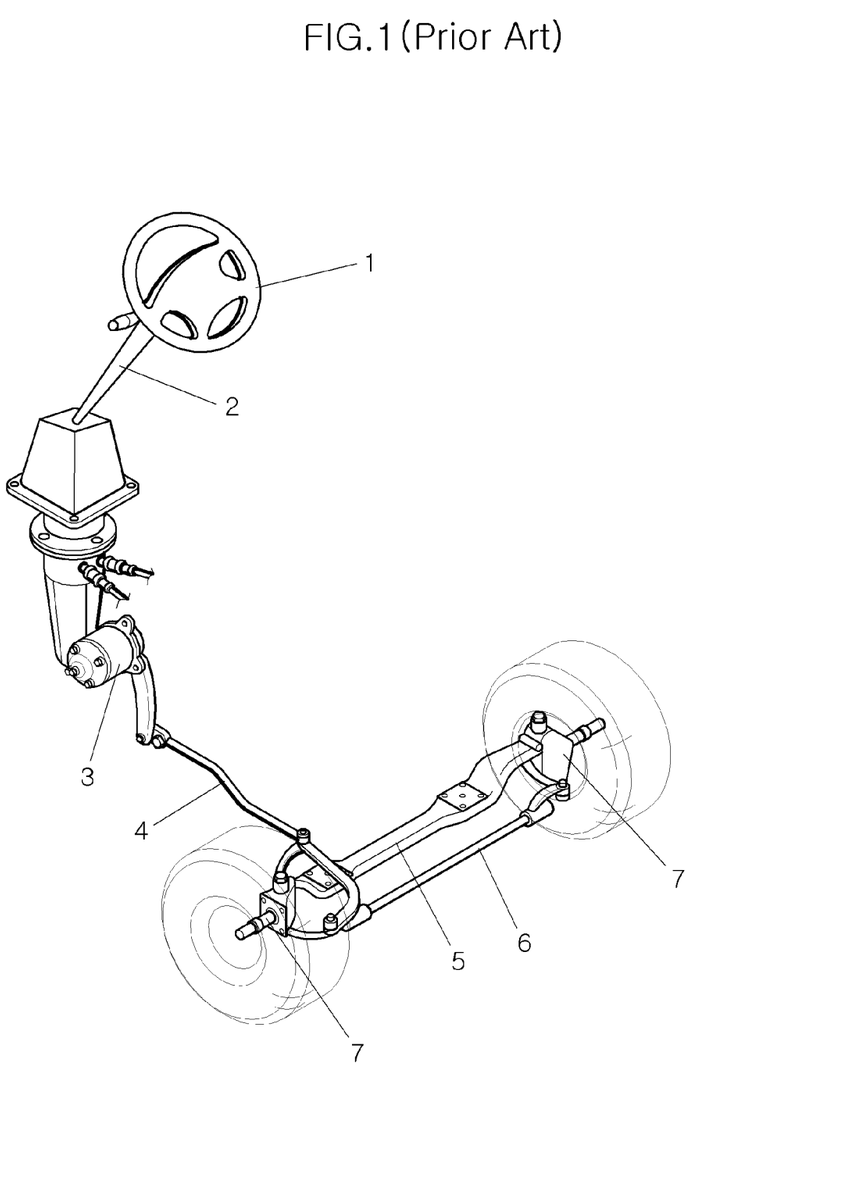
FIG. 1 is a schematic perspective view illustrating the structure of a front axle and a steering wheel in a typical vehicle.

FIG. 1 schematically illustrates a connection structure between a front axle and a steering wheel which are applied to a vehicle or particularly a commercial vehicle. When a driver operates a steering wheel 1, the steering force is transmitted to a gear box 3 through a column shaft 2. Then, the steering force is increased by a hydraulic pressure or driving force of a motor, and transmitted to a tie rod 6 through a drag link 4. The steering force transmitted to the tie rod 6 rotates a knuckle 7 which is rotatably installed on the axle 5, and steers a front wheel of the vehicle.

Figure 2:
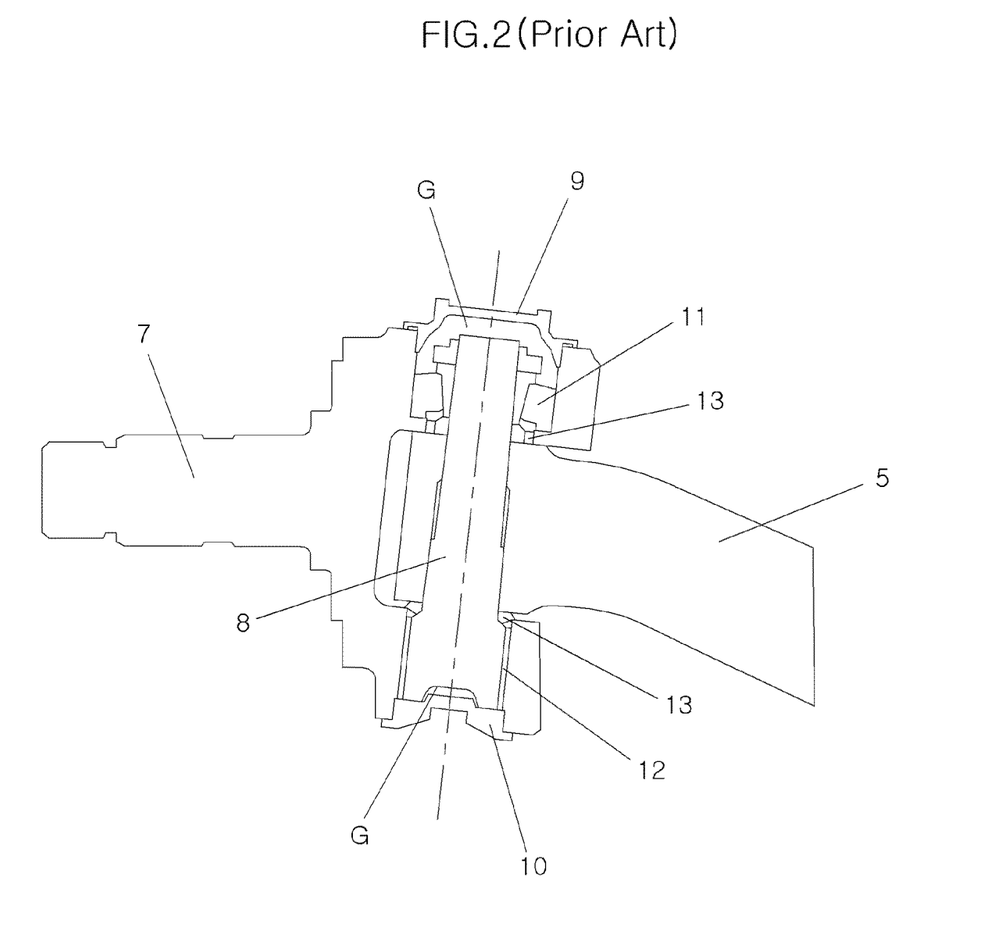
FIG. 2 is a cross-sectional view illustrating a connection portion between a knuckle and an axle in a conventional front axle of a vehicle, capable of reducing vibration.

FIG. 2 illustrates the connection portion between the axle 5 and the knuckle 7. Referring to FIG. 2, the axle 5 and the knuckle 7 are hinge-coupled through a king pin 8. The king pin 8 passes through the axle 5 and the knuckle 7, and filled with lubricant oil such as grease G for smooth rotation of the knuckle 7 and the axle 5. At the upper portion of the king pin 8, a space formed between an upper cover 9 and a taper bearing 11 is filled with grease G. At the lower portion of the king pin 8, a space formed between the lower end of the king pin 8 and a lower cover 10 is filled with grease G. Thus, when the knuckle 7 is rotated with respect to the axle 5, the grease G may reduce friction. In order to prevent leakage of the grease G, seals 13 are installed on the top and bottom surfaces of the portion to which the axle 5 is connected.

Between the lower portion of the king pin 8 and the knuckle 7, a king pin bushing 12 is installed. The king pin bushing 12 may be worn out by an external force generated by a steering operation or a bump during operation. Thus, a gap may occur between the king pin bushing 12 and the king pin 8. The gap causes vibration when the vehicle is braked. The vibration may be transmitted to the steering wheel 1 such that the driver feels the vibration.

In order to reduce the vibration, a separate damper is installed between the axle 5 and the knuckle 7. However, when the damper is added, the cost may be increased, and a space for installing the damper must be secured.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a front axle of a vehicle, which is capable of reducing vibration while lubricant oil stored in a space between a knuckle and a king pin passes during a steering operation.

According to various embodiments of the present invention, a front axle of a vehicle, capable of reducing vibration, which is connected to a knuckle having a front wheel disposed thereon through a king pin, in which a gap is formed between the knuckle and the king pin passing through the front axle and the knuckle, and filled with lubricant oil, and at least one of the king pin and the knuckle may include a plurality of rollers disposed therein, the rollers having an axis parallel to an axial direction of the king pin while circumferences of the rollers are partially buried in at least one of the king pin and the knuckle.

The knuckle may include an end portion divided into upper and lower portions to support top and bottom surfaces of an end portion of the front axle, and the rollers may be disposed between a lower portion of the king pin and the end portion of the knuckle which supports the bottom surface of the end portion of the front axle.

A king pin bushing may be inserted between the knuckle and the king pin, a lower end of the king pin bushing may be separated from a lower cover fitted to a bottom surface of the knuckle, and the rollers may be positioned between the lower end of the king pin bushing and the lower cover.

Each of the rollers may include a grease groove formed along the circumference thereof, each grease groove having a predetermined depth from an outer surface of each roller.

One side of the outer surface of a roller disposed in the king pin among the rollers may contact an inner surface of the knuckle, and one side of the outer surface of a roller disposed in the knuckle among the rollers may contact an outer surface of the king pin.

Each roller may be disposed to be inserted into the knuckle.

The knuckle may include a plurality of knuckle roller grooves formed at intervals on an inner surface thereof, and the rollers may be disposed in the knuckle roller grooves.

Each roller may be disposed to be inserted into an outer surface of the king pin.

The rollers may be alternately disposed in the inner surface of the knuckle and the outer surface of the king pin.

The king pin may include a plurality of king pin roller grooves formed at intervals on the outer surface thereof, and the rollers may be disposed in the king pin roller grooves.

The rollers may be disposed apart at even intervals.

The vehicle may be a commercial vehicle.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereafter, a front axle of a vehicle, capable of reducing vibration, will be described in detail with the accompanying drawings.

Figure 3:
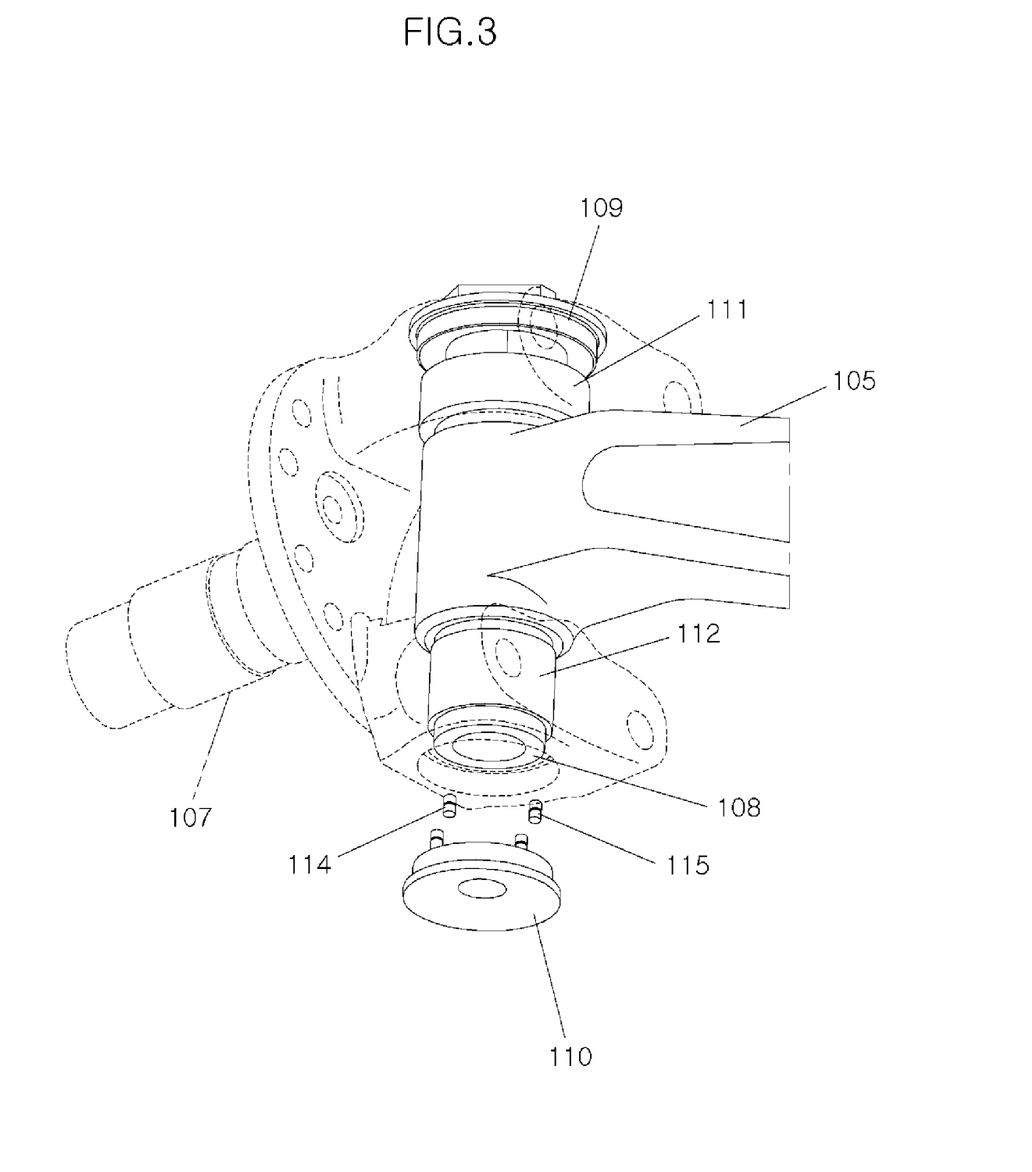
FIG. 3 is a bottom perspective view illustrating a connection portion between a knuckle and an axle in a front axle of a vehicle, capable of reducing vibration, in accordance with various embodiments of the present invention.

The front axle of a vehicle in accordance with various embodiments of the present invention may be connected to a knuckle 107 having a front wheel installed thereon through a king pin 108. Between the knuckle 107 and the king pin 108 passing through the front axle 105 and the knuckle 107, a gap may be formed to be filled with lubricant oil. At least one of the king pin 108 and the knuckle 107 may include a plurality of rollers 114 and 115 formed therein. The plurality of rollers 114 and 115 may have an axis parallel to the axial direction of the king pin 108, while circumferences thereof are partially buried in the king pin 108 or the knuckle 107.

For a steering operation in a vehicle or particularly a commercial vehicle, the knuckle 107 having a front wheel installed thereon may be connected to an end portion of the front axle 105 through the king pin 108. Between the knuckle 107 and the king pin 108, a plurality of rollers 114 and 115 may be installed.

The knuckle 107 may have an end portion divided into an upper portion and a lower portion, and support the top and bottom surfaces of the end portion of the axle 105 while overlapping the top and bottom surfaces. The king pin 108 may be passed through the overlapping portions so as to connect the knuckle 107 and the axle 105.

The middle portion of the king pin 108 may be inserted into the end portion of the axle 105, and the upper and lower portions of the king pin 108 may be inserted into the knuckle 107.

Figure 7:
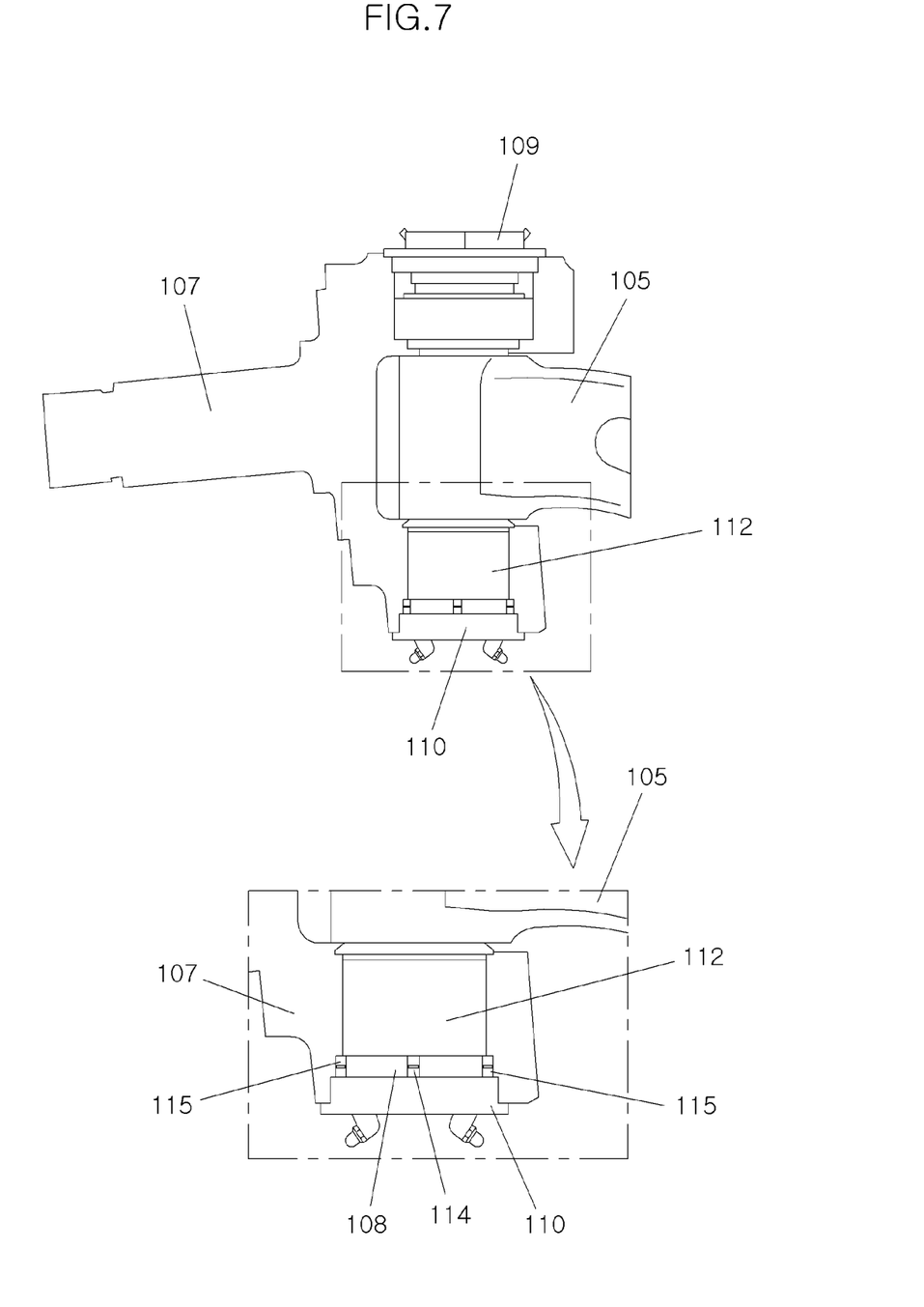
FIG. 7 is a cross-sectional view illustrating a state in which king pin rollers and knuckle rollers are disposed at the connection portion between the knuckle and the axle in the front axle of a vehicle, capable of reducing vibration, in accordance with various embodiments of the present invention.

Between the upper portion of the king pin 108 and the knuckle 107, a taper bearing 111 may be installed. Furthermore, an upper cover 109 may be fitted to the upper end of the knuckle 107 so as to be separated from the upper end of the king pin 108. The space formed between the upper portion of the knuckle 107 and the upper portion of the king pin 108 may be filled with lubricant oil, for example, grease G.

Between the lower portion of the king pin 108 and the lower portion of the knuckle 107, a king pin bushing 112 may be inserted. Thus, the lower portion of the king pin 108 and the inner surface of the knuckle 107 may not be in direct contact with each other, but instead a gap may be formed therebetween. A lower cover 110 may be fitted to the lower end of the knuckle 107 so as to be separated from the lower end of the king pin 108. The lower cover 110 may also be separated from the lower end of the king pin bushing 112 to form a space, and the space may be filled with lubricant oil.

Between the lower portion of the king pin 108 and the lower portion of the knuckle 107, a plurality of rollers 114 and 115 may be installed. The plurality of rollers 114 and 115 may help the lubricant oil to serve as resistance with respect to the rotation of the knuckle 107, when the knuckle 107 is rotated. The rollers 114 and 115 may be installed between the lower end of the king pin bushing 112 and the lower cover 110.

The plurality of rollers 114 and 115 may be formed in a cylindrical shape of which the axis is parallel to the axial direction of the king pin 108. A part of circumferences of the rollers 114 and 115 may be buried in the outer surface of the king pin 108 or the inner surface of the knuckle 107, and the other part of the circumferences of the rollers 114 and 115 may be exposed between the lower portion of the king pin 108 and the lower portion of the knuckle 107.

Figure 8:
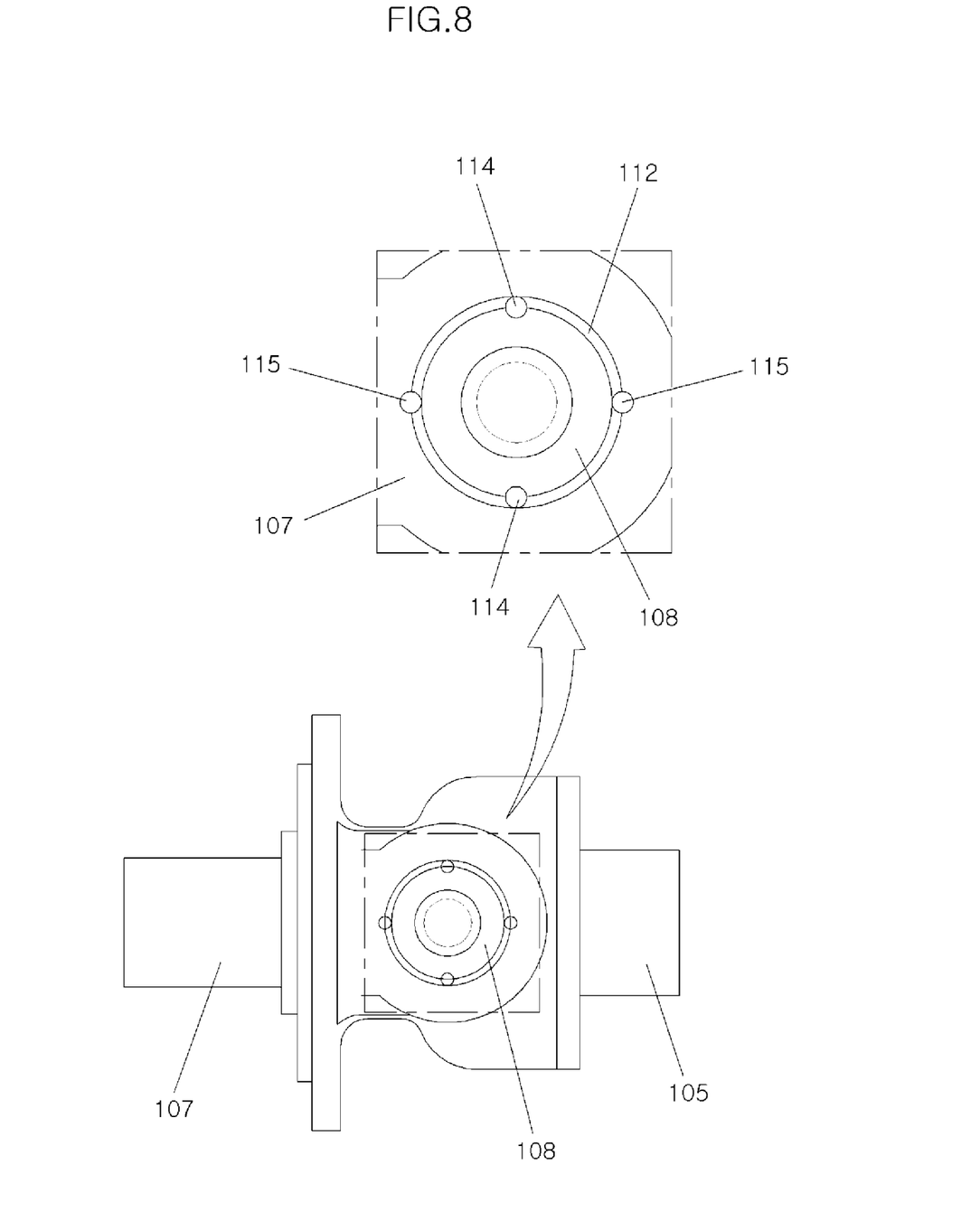
FIG. 8 is a bottom view illustrating a state in which the king pin rollers and the knuckle rollers are disposed at the connection portion between the knuckle and the axle in the front axle of a vehicle, capable of reducing vibration, in accordance with various embodiments of the present invention.

For example, the plurality of rollers 114 and 115 may be installed at intervals along the circumference of the king pin 108. Desirably, the plurality of rollers 114 and 115 may be alternately installed on the inner surface of the knuckle 107 and the outer surface of the king pin 108.

Figure 4A:
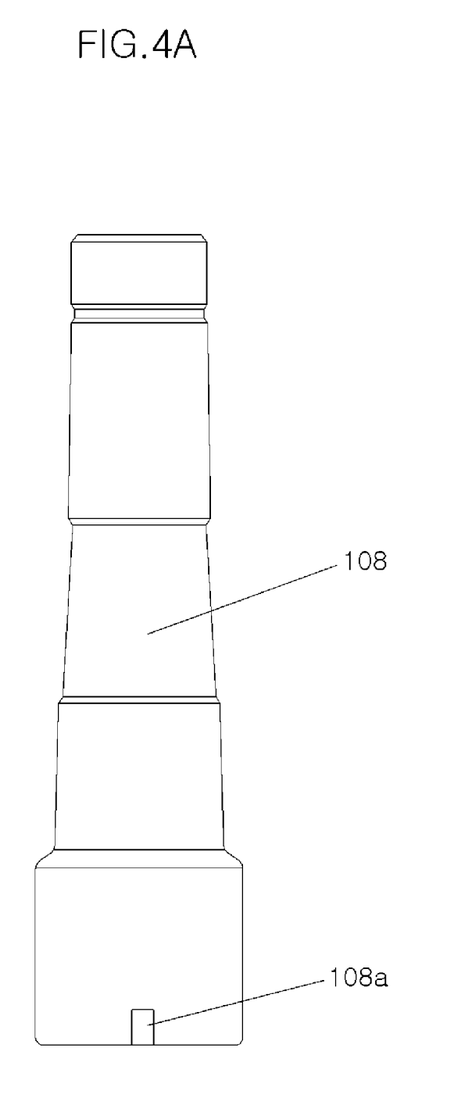
FIG. 4A and FIG. 4B are front and bottom views of a king pin in the front axle of a vehicle, capable of reducing vibration, in accordance with various embodiments of the present invention.
Figure 4B:
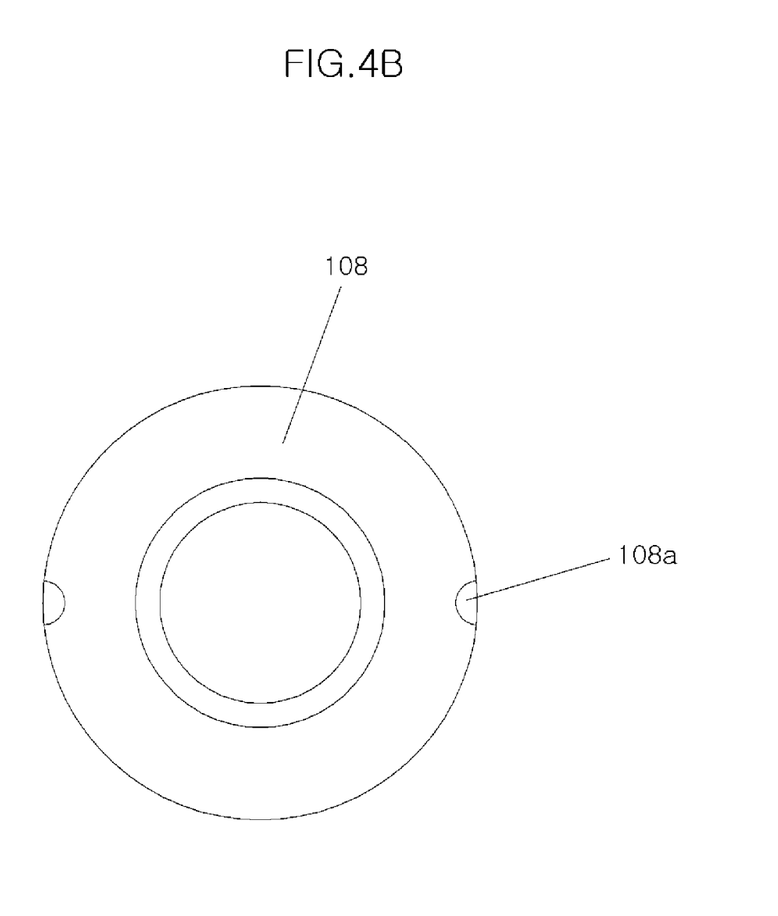

For this structure, the king pin 108 may have king pin roller grooves 108a formed at intervals in the outer surface thereof along the circumference thereof, and a part of the king pin rollers 114 may be buried in the king pin roller grooves 108a.

Figure 5:
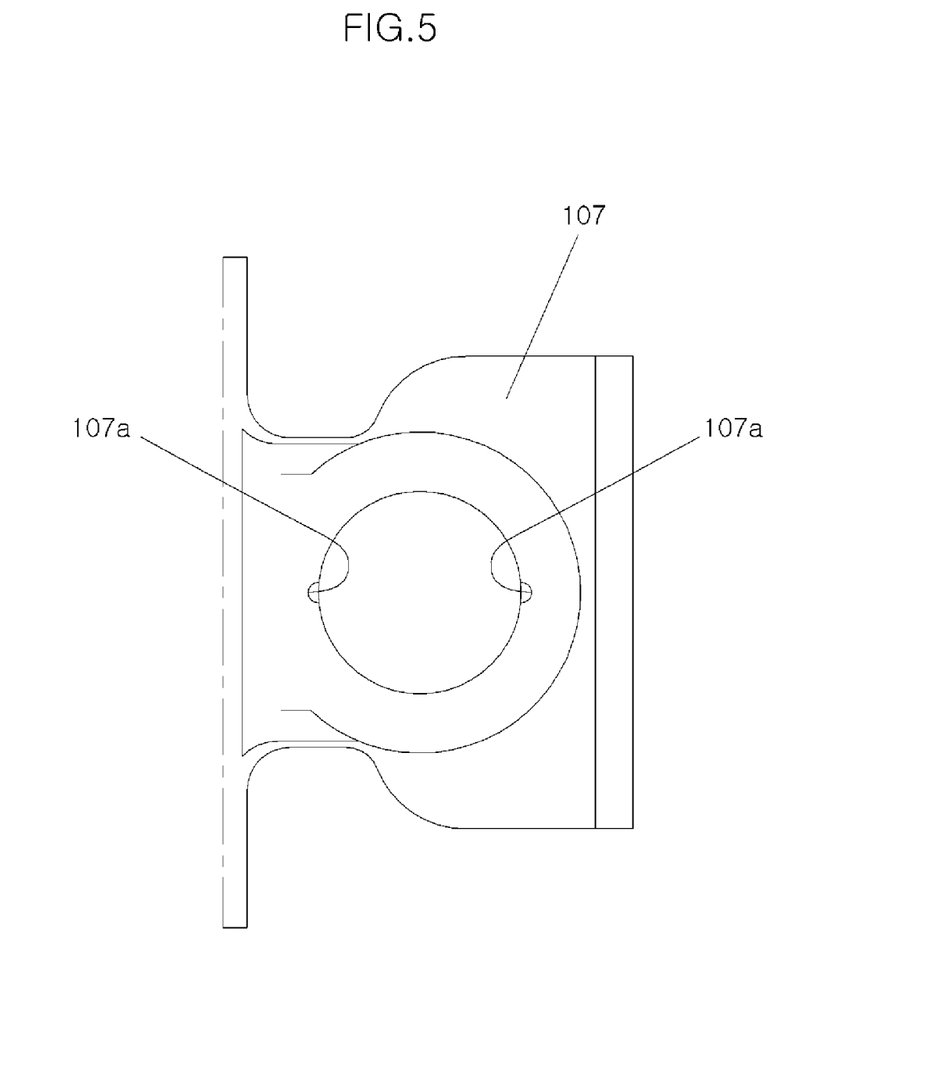
FIG. 5 is a bottom perspective view of the knuckle in the front axle of a vehicle, capable of reducing vibration, in accordance with various embodiments of the present invention.

The knuckle may also have knuckle roller grooves 107a formed at intervals in the inner surface thereof along the circumference thereof (refer to FIG. 5), and a part of the knuckle rollers 115 may be buried in the knuckle roller grooves 107a.

The king pin rollers 114 and the knuckle rollers 115 may have the same shape. Depending on the installation positions, however, the rollers may be divided into the king pin rollers 114 and the knuckle rollers 115.

Figure 6:
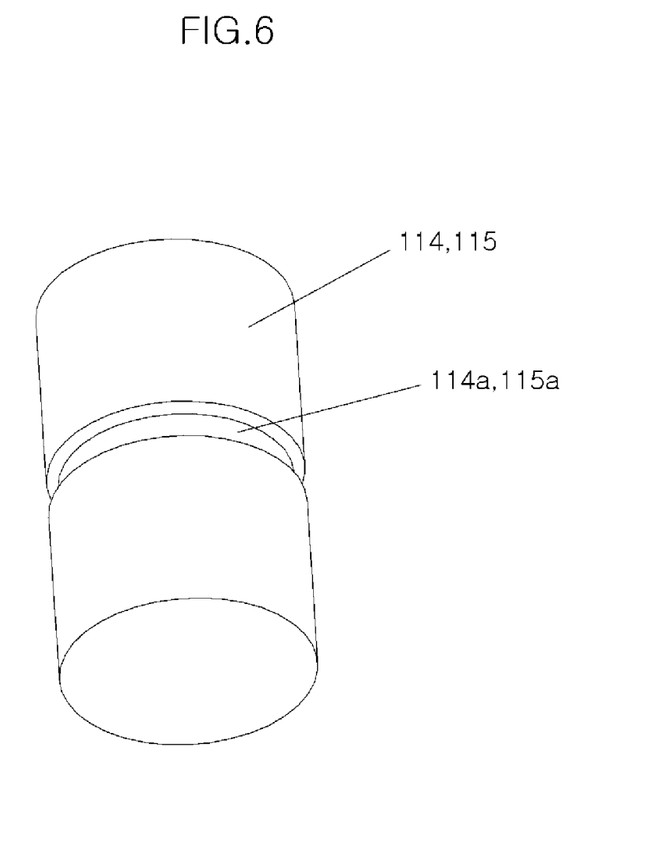
FIG. 6 is a perspective view of a king pin roller or knuckle roller which is disposed in the knuckle and the axle in the front axle of a vehicle, capable of reducing vibration, in accordance with various embodiments of the present invention.

As illustrated in FIG. 6, each of the rollers 114 and 115 may have a grease groove 114a or 115a formed along the circumference thereof, such that the lubricant oil can be passed, the grease groove having a predetermined depth from the outer surface of the roller. The grease grooves 114a and 115a may be formed in the king pin roller 114 and the knuckle roller 115, respectively.

The king pin roller 114 and the knuckle roller 115 may be alternately arranged. Thus, as illustrated in FIG. 8, two king pin rollers 114 and two knuckle rollers 115 may be installed at an interval of 180 degrees.

The king pin roller 114 may be installed in such a manner that one side of the outer surface of the king pin roller 114, that is, a portion protruding from the king pin roller groove 108a is in contact with the inner surface of the knuckle 107. The knuckle roller 115 may be installed in such a manner that one side of the outer surface of the king pin roller 114, that is, a portion protruding from the knuckle roller groove 107a is in contact with the outer surface of the king pin 108. As the king pin roller 114 and the knuckle roller 115 are in contact with the inner surface of the knuckle 107 and the outer surface of the king pin 108, respectively, the space between the king pin 108 and the knuckle 107, which is filled with oil, may be divided into a plurality of spaces. When the knuckle 107 is rotated, oil may flow only through the grease grooves 114a and 115a, thereby reducing vibration.

Hereafter, the operation of the front axle of a vehicle, capable of reducing vibration, in accordance with various embodiments of the present invention will be described.

FIG. 8 illustrates the knuckle 107 and the axle 105 when the vehicle goes straight.

At this time, both of the king pin rollers 114 and the knuckle rollers 115 may maintain their initial positions between the knuckle 107 and the king pin 108.

When a driver operates the steering wheel 1 for a steering operation, the knuckle 107 may be rotated about the king pin 108. At this time, the knuckle rollers 115 may be rotated with the knuckle 107, and the king pin 108 and the king pin rollers 114 may not be rotated.

Figure 9:
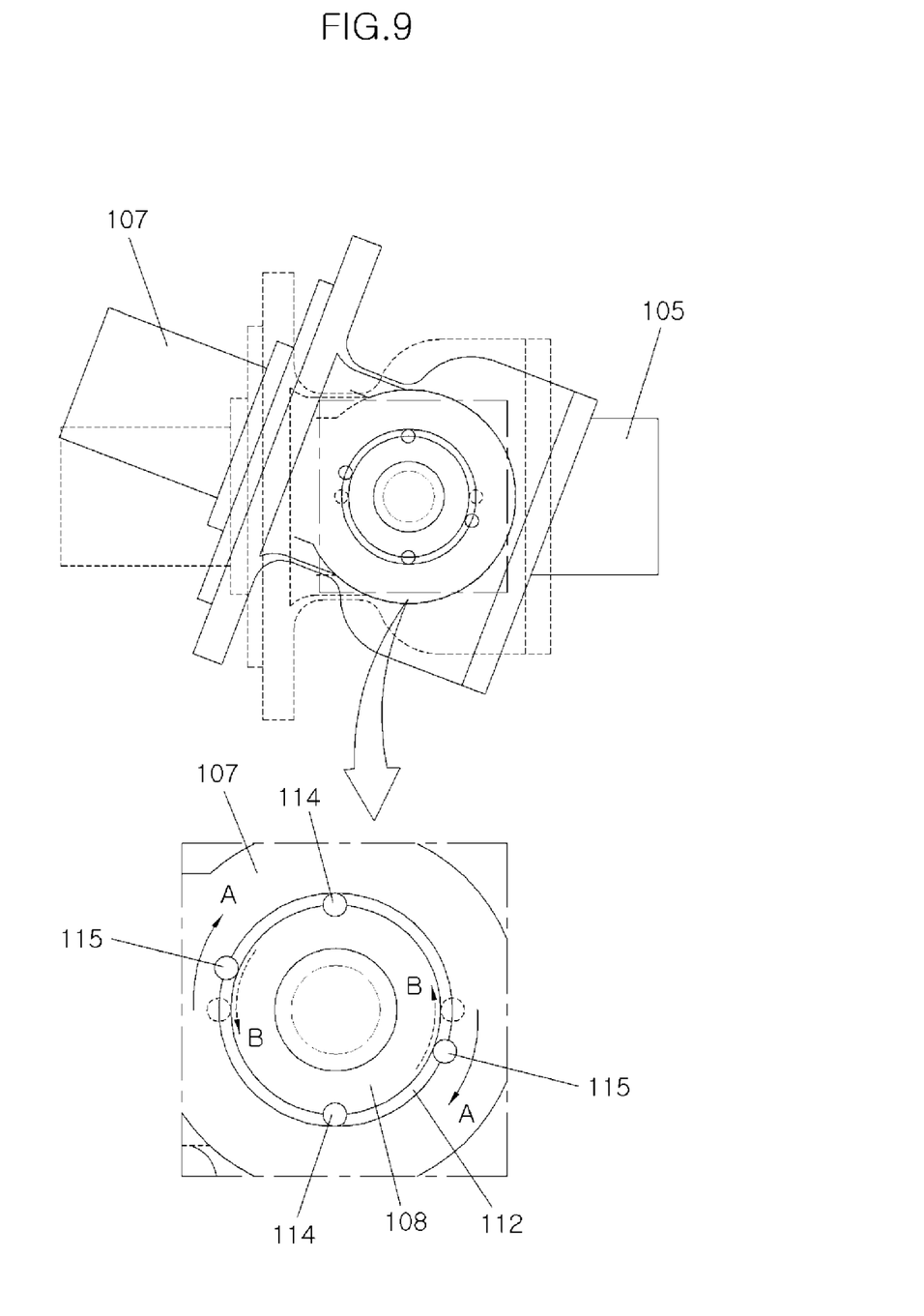
FIG. 9 is a bottom view illustrating a state in which the knuckle is rotated in the front axle of a vehicle, capable of reducing vibration, in accordance with various embodiments of the present invention.

When the knuckle 107 is rotated in a direction A as illustrated in FIG. 9, the knuckle rollers 115 may be moved in the direction A, and oil stored between the knuckle rollers 115 and the king pin rollers 114 may be passed in the opposite direction or a direction B. At this time, since the oil needs to be moved through the grease grooves 115a of the knuckle rollers 115, the vibration reduction effect can be obtained through the viscosity of the oil.

Furthermore, as the knuckle 107 is rotated in the direction A, a part of the oil may be pushed by the knuckle roller 115 and passed through the king pin rollers 114. At this time, however, since the oil needs to be moved only through the grease grooves 114a of the king pin rollers 114, the vibration reduction effect can be obtained through the viscosity of the oil.

That is, when the knuckle 107 is rotated by a steering operation, the oil may be compressed by the knuckle rollers 115 and the king pin rollers 114, and passed only through the grease grooves 114a and 115a. Thus, vibration can be reduced.

In accordance with various embodiments of the present invention, the front axle of a vehicle, capable of reducing vibration, may have a simple structure that can acquire a vibration reduction effect using the viscosity of lubricant oil which is stored between the knuckle and the king pin and moved in the opposite direction of the rotation direction of the knuckle during a steering operation.

As such, since vibration can be reduced by the oil stored between the knuckle and the king pin, vibration transmitted from the road surface to the steering wheel can be reduced to prevent vibration of the steering wheel.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A front axle of a vehicle, configured for reducing vibration, which is connected to a knuckle having a front wheel disposed thereon through a king pin,
    wherein a gap is formed between the knuckle and the king pin passing through the front axle and the knuckle, and filled with lubricant oil,
    wherein at least one of the king pin and the knuckle comprise a plurality of rollers disposed therein, the rollers having an axis parallel to an axial direction of the king pin while circumferences of the rollers are partially buried in at least one of the king pin and the knuckle,
    wherein the knuckle includes an end portion divided into upper and lower portions to support top and bottom surfaces of an end portion of the front axle,
    wherein the rollers are disposed between a lower portion of the king pin and the end portion of the knuckle which supports a bottom surface of the end portion of the front axle, and
    wherein a king pin bushing is inserted between the knuckle and the king pin,
    wherein a lower end of the king pin bushing is separated from a lower cover fitted to a bottom surface of the knuckle, and
    wherein the rollers are positioned between the lower end of the king pin bushing and the lower cover.

2. The front axle of claim 1, wherein each of the rollers includes a grease groove formed along the circumference thereof, each grease groove having a predetermined depth from an outer surface of each roller.

3. The front axle of claim 2, wherein
a first side of an outer surface of a roller disposed in the king pin among the rollers contacts an inner surface of the knuckle; and
a first side of an outer surface of a roller disposed in the knuckle among the rollers contacts an outer surface of the king pin.

4. The front axle of claim 2, wherein each roller is disposed to be inserted into the knuckle.

5. The front axle of claim 4,
wherein the knuckle includes a plurality of knuckle roller grooves formed at intervals on an inner surface thereof, and
wherein the rollers are disposed in the knuckle roller grooves.

6. The front axle of claim 4, wherein each roller is disposed to be inserted into an outer surface of the king pin.

7. The front axle of claim 6,
wherein the king pin includes a plurality of king pin roller grooves formed at intervals on the outer surface thereof, and
wherein the rollers are disposed in the king pin roller grooves.

8. The front axle of claim 4, wherein the rollers are alternately disposed in an inner surface of the knuckle and an outer surface of the king pin.

9. The front axle of claim 1, wherein the rollers are disposed apart at even intervals.

10. The front axle of claim 1, wherein the vehicle comprises a commercial vehicle.

* * * * *